(12) United States Patent
Kodama

(10) Patent No.: US 9,098,920 B2
(45) Date of Patent: *Aug. 4, 2015

(54) IMAGE CAPTURING APPARATUS AND METHOD FOR CONTROLLING THE SAME

(75) Inventor: Yasunobu Kodama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

This patent is subject to a terminal disclaimer.

(21) Appl. No.: 13/490,843

(22) Filed: Jun. 7, 2012

(65) Prior Publication Data

US 2012/0242838 A1 Sep. 27, 2012

Related U.S. Application Data

(63) Continuation of application No. 12/544,715, filed on Aug. 20, 2009, now Pat. No. 8,212,896.

(30) Foreign Application Priority Data

Aug. 26, 2008 (JP) ................................. 2008-217323

(51) Int. Cl.
*H04N 5/262* (2006.01)
*G06T 7/20* (2006.01)
*H04N 5/232* (2006.01)

(52) U.S. Cl.
CPC ............ *G06T 7/204* (2013.01); *H04N 5/23219* (2013.01); *G06T 2207/10016* (2013.01); *G06T 2207/20004* (2013.01); *G06T 2207/30201* (2013.01)

(58) Field of Classification Search
USPC ............. 348/239, 155, 207.99, 208.6, 222.1; 382/118
See application file for complete search history.

(56) References Cited

U.S. PATENT DOCUMENTS 7,433,495 B2 * 10/2008 Rui et al. ...................... 382/103
8,396,262 B2 * 3/2013 Aisaka et al. ................. 382/118

FOREIGN PATENT DOCUMENTS

| JP | 2002-245560 A | 8/2002 |
| JP | 2007-042072 A | 2/2007 |
| JP | 2007-142527 A | 6/2007 |

* cited by examiner

*Primary Examiner* — Tuan Ho
(74) *Attorney, Agent, or Firm* — Cowan, Liebowitz & Latman, P.C.

(57) ABSTRACT

An image capturing apparatus is provided that is capable of performing both object detection using image recognition and object detection using movement detection on successively captured images. In the image capturing apparatus, the reliability of the result of the object detection using image recognition is evaluated based on the previous detection results. If it is determined that the reliability is high, execution of the object detection using movement detection is determined. If it is determined that the reliability is low, non-execution of the object detection using movement detection is determined. With this configuration, the object region can be tracked appropriately.

11 Claims, 8 Drawing Sheets

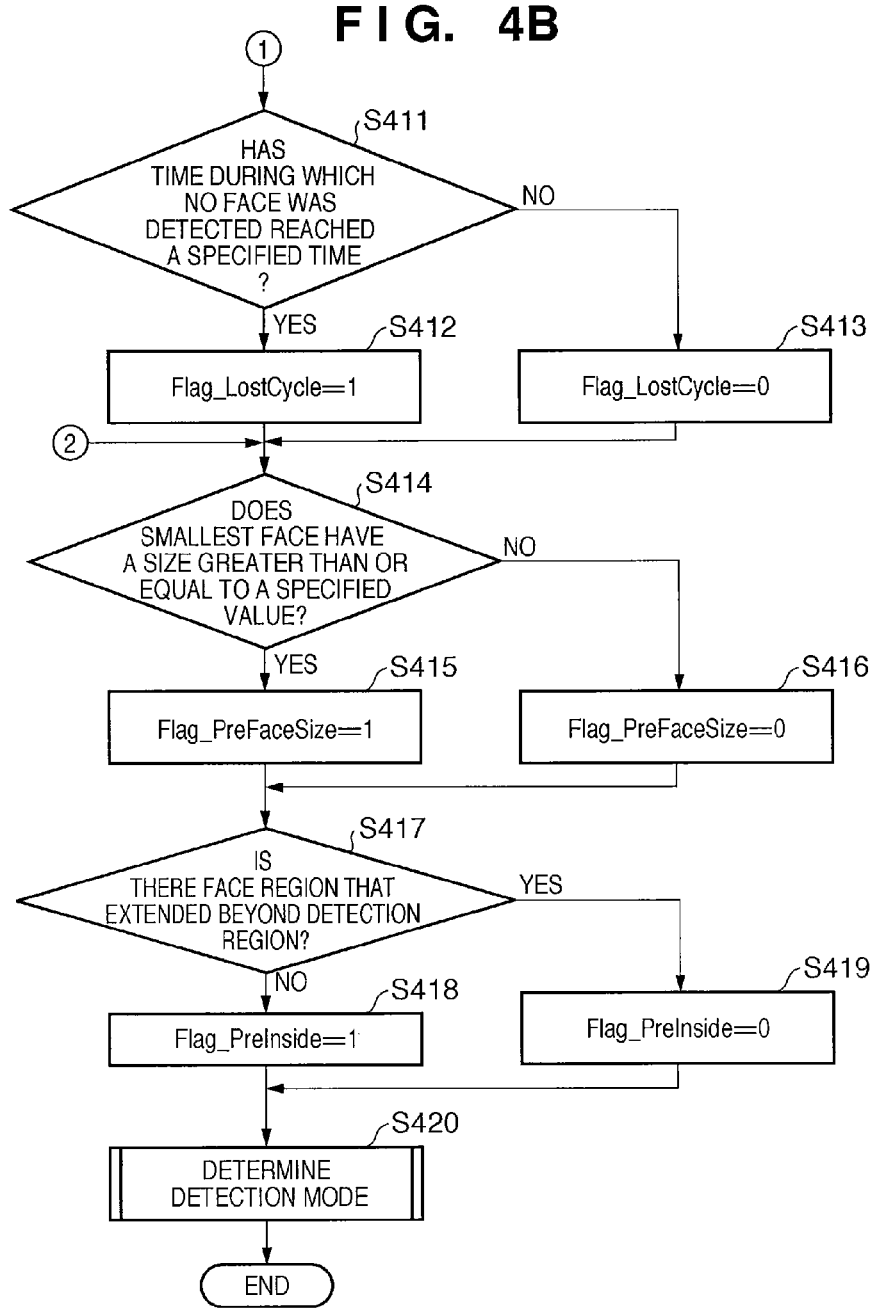

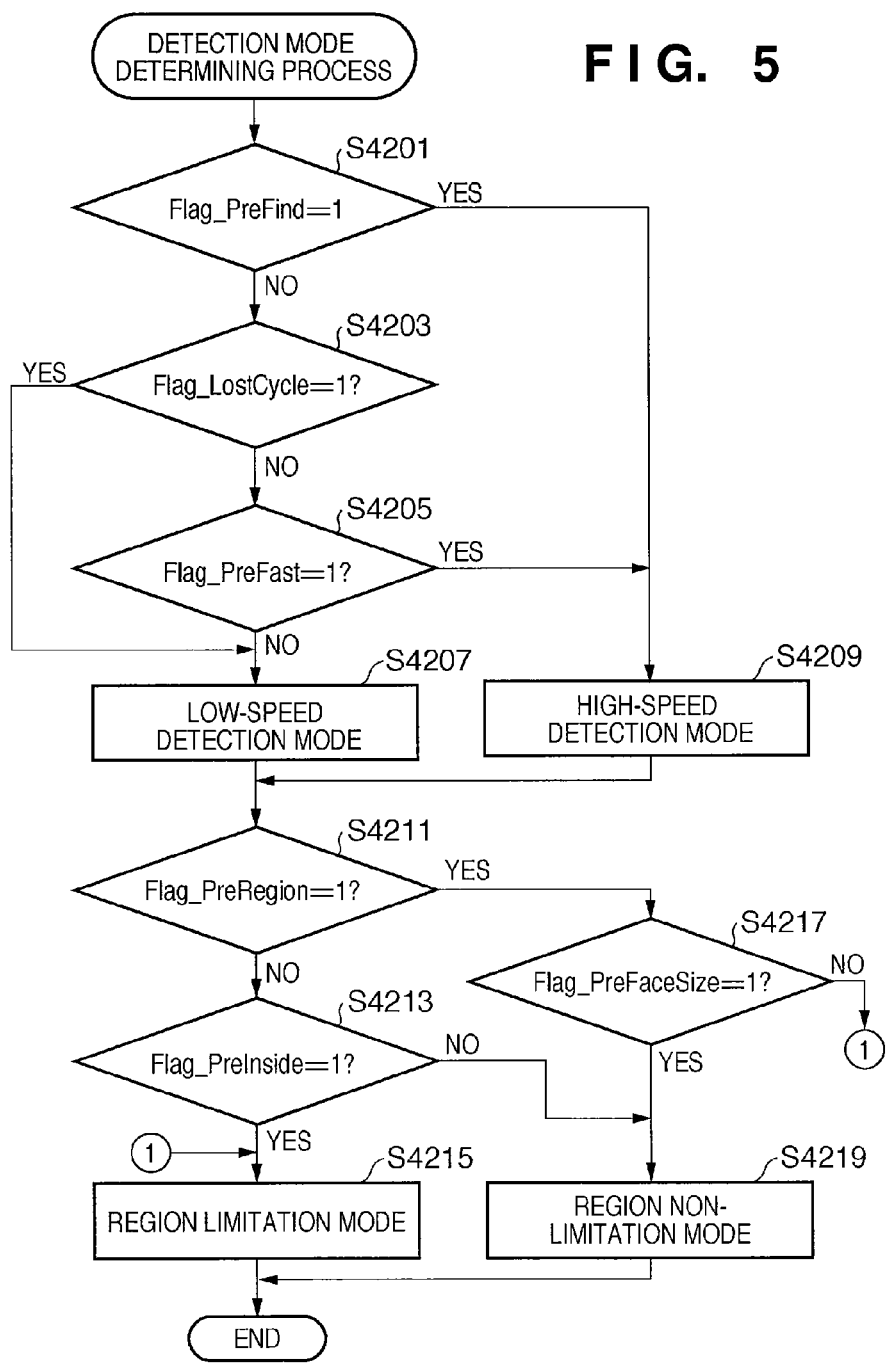

F I G. 7
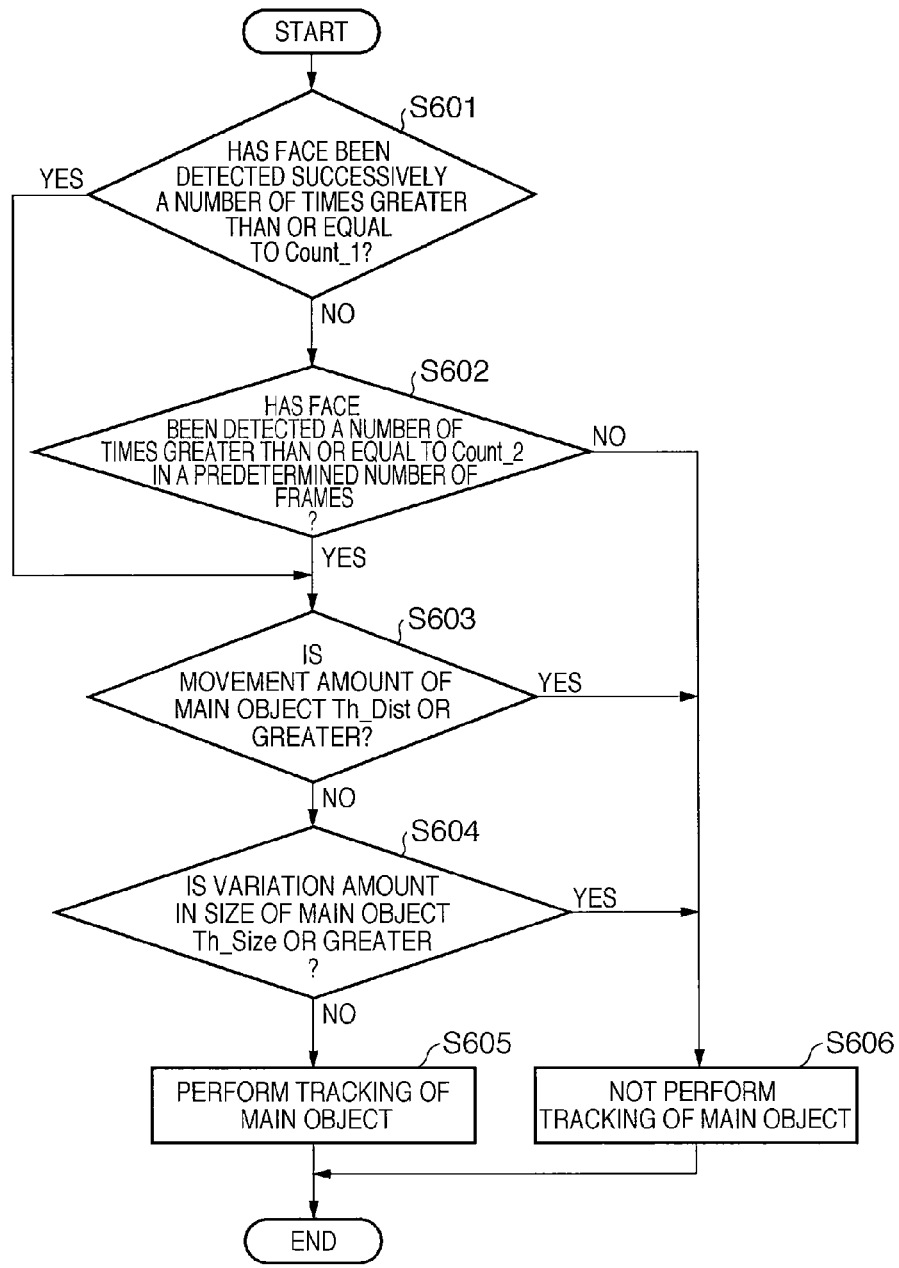

IMAGE CAPTURING APPARATUS AND METHOD FOR CONTROLLING THE SAME

CROSS-REFERENCE TO RELATED APPLICATION

This application is a continuation of application Ser. No. 12/544,715, filed Aug. 20, 2009, the entire disclosure of which is hereby incorporated by reference.

BACKGROUND OF THE INVENTION

1. Field of the Invention

The present invention relates to an image capturing apparatus and a method for controlling the same, and more particularly to an image capturing apparatus that has a function of detecting an object, and a method for controlling the same.

2. Description of the Related Art

An image capturing apparatus in which a photoelectric conversion element is used, such as a digital camera or a video camera, can detect an object from captured images using an image processing technique. Accordingly, image capturing apparatuses that perform auto focus control (AF) that causes an optical system of the apparatus to focus on a detected object and auto exposure control (AE) that sets exposure parameters to the apparatus such that the detected object is to be captured with an appropriate exposure are realized.

For example, a case is considered in which, in order to cause a display apparatus of an image capturing apparatus to function as an electronic viewfinder (EVF), continuous detection of an object is performed in EVF images (also referred to as live images, through-the-lens images, live view images, and so on) that are successively captured. In such a case, it is possible to employ, for example, a method disclosed by Japanese Patent Laid-Open No. 2007-274587 in which an object is detected from individual images using an image recognition technique such as face detection, or a method disclosed by Japanese Patent Laid-Open No. 2001-243478 in which a movement is detected (tracked) in a region designated as an object region.

With face detection, an object is detected from individual images by extracting a face feature, such as an eye or mouth, from the images and determining whether the object is a face. With the method of tracking an object region, on the other hand, an object is detected from individual images by searching a frame image for a region that has a high correlation with the object region that has been selected in another frame image. Hereinafter, for the sake of convenience, detection of an object using an image recognition technique such as face detection is referred to as "face detection", and detection of an object by detecting a movement in the object region is referred to as "moving-subject detection" throughout the specification. It should be noted, however, that they are not intended to limit the object to a human face.

Because face detection requires the recognition of each of a plurality of parts constituting a face, the accuracy of object detection is high, but the computation is complicated and it takes time in processing, so face detection is inferior to moving-subject detection in terms of object detection speed (tracking capability). In contrast, with moving-subject detection, an object is detected through a differential operation between a plurality of frame images, so the processing speed is faster than face detection, but when an object's luminance changes, the detection becomes difficult, so moving-subject detection is inferior to face detection in terms of detection accuracy.

As described above, with the conventional method of tracking an object region, when priority is given to object detection accuracy, the detection speed decreases, and when priority is given to detection speed, the detection accuracy decreases.

SUMMARY OF THE INVENTION

The present invention has been conceived in view of the problems encountered in the conventional technology, and provides an image capturing apparatus capable of appropriately tracking an object region and a method for controlling such an image capturing apparatus.

According to an aspect of the present invention, there is provided an image capturing apparatus comprising: an acquisition unit configured to acquire images that are successively captured with an image sensor; a first detection unit configured to continuously detect a predetermined object in the images with image recognition; a second detection unit configured to detect the object by sequentially detecting a movement of a region including the object detected by the first detection unit, in a plurality of successive images included in the images; and an evaluation unit configured to, based on results of detections performed on a predetermined number of preceding images by the first detection unit, continuously evaluate a reliability of a current detection result of the first detection unit, wherein the second detection unit detects a movement of the region including the object currently detected by the first detection unit when the evaluation unit has determined that the reliability of the current detection result is high, and does not detect a movement of the region including the object currently detected by the first detection unit when the evaluation unit has determined that the reliability of the current detection result is low.

According to another aspect of the present invention, there is provided a method for controlling an image capturing apparatus, comprising: acquiring step of acquiring images that are successively captured with an image sensor; first detection step of continuously detecting a predetermined object in the images with image recognition; second detection step of detecting the object by sequentially detecting a movement of a region including the object detected in the first detection step, in a plurality of successive images included in the images; and evaluation step of continuously evaluating, based on results of detections performed on a predetermined number of preceding images by the first detection step, continuously evaluate a reliability of a current detection result of the first detection step, wherein the second detection step involves detecting a movement of the region including the object currently detected in the first detection step when it is determined in the evaluation step that the reliability of the current detection result is high, and not detecting a movement of the region including the object currently detected in the first detection step when it is determined in the evaluation step that the reliability of the current detection result is low.

Further features of the present invention will become apparent from the following description of exemplary embodiments with reference to the attached drawings.

BRIEF DESCRIPTION OF THE DRAWINGS

FIGS. 4A and 4B are flowcharts illustrating an operation performed by a face detection unit of a digital camera according to an embodiment of the present invention.

FIG. 5 is a flowchart illustrating a process for determining a detection mode performed in S420 of FIG. 4B in detail.

FIG. 7 is a flowchart illustrating a process for evaluating whether or not to track an object performed by a moving-subject detection unit of a digital camera according to an embodiment of the present invention.

DESCRIPTION OF THE EMBODIMENTS

Exemplary embodiments of the present invention will now be described in detail in accordance with the accompanying drawings.

An image capturing apparatus according to the present embodiment achieves stable detection of an object through combined use of face detection and object tracking in which a moving-subject is detected in an object region detected by the face detection, and suppresses tracking of an incorrectly detected face region.

Figure 1:
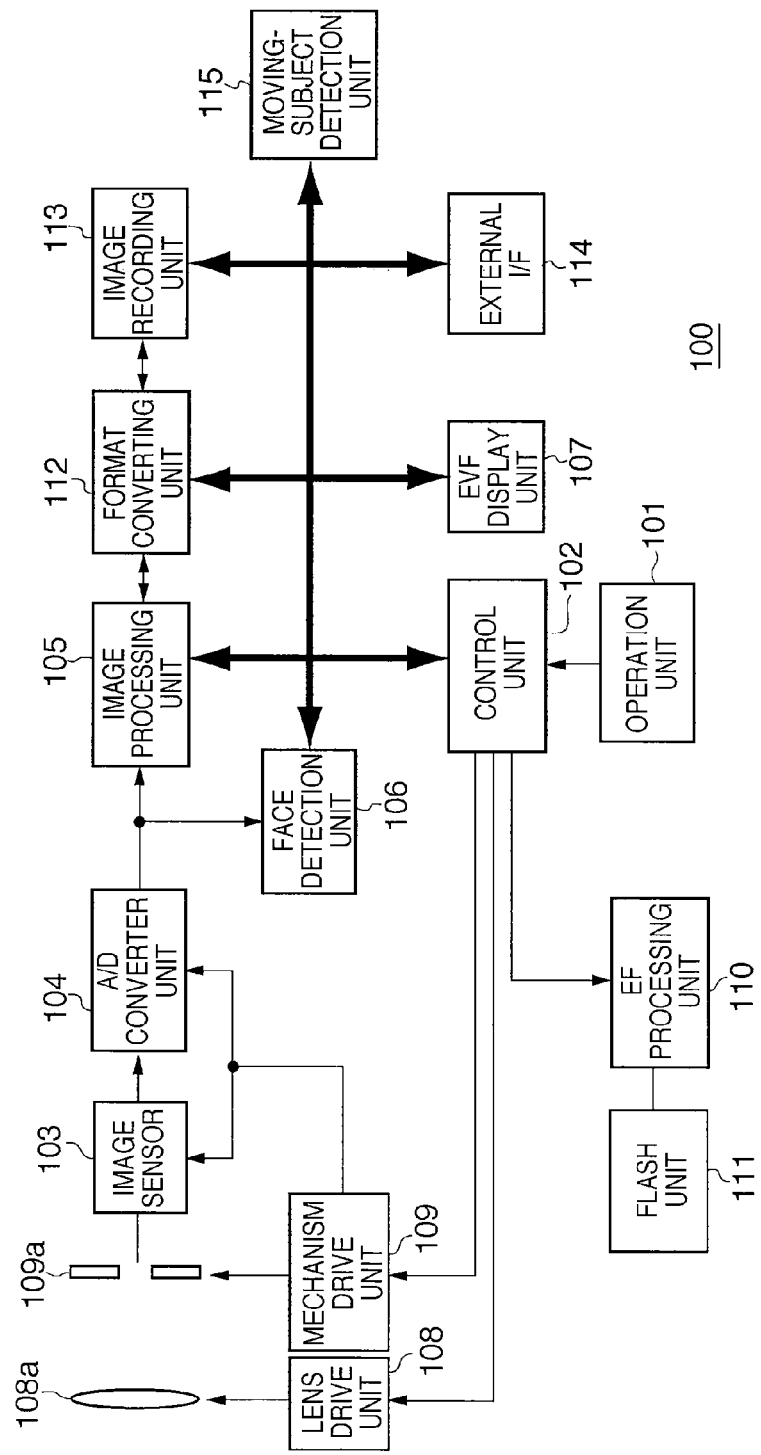
FIG. 1 is a block diagram showing an example of a functional configuration of a digital camera as an example of an image capturing apparatus according to an embodiment of the present invention.

FIG. 1 is a block diagram showing an example of a functional configuration of a digital camera as an example of the image capturing apparatus according to the present embodiment.

Configuration of Digital Camera

An operation unit 101 is a user interface for inputting various instructions to a digital camera 100 by a user of the digital camera 100, and is configured of input devices such as switches and buttons.

The operation unit 101 also includes a shutter switch. When the shutter switch is pressed halfway, a signal SW1 is transmitted to a control unit 102, and when the shutter switch is pressed fully, a signal SW2 is transmitted to the control unit 102.

The control unit 102 controls the operations of various units included in the digital camera 100 in response to an instruction from the operation unit 101, and implements the functionality of the digital camera 100. The control unit 102 is configured of, for example, a CPU, a nonvolatile memory that stores programs that are executed by the CPU, and a RAM that is used as a work area and into which programs are read.

The control unit 102 calculates the luminance of an object from digital image data output by an image processing unit 105 (described later), and implements an auto exposure control (AE) function that automatically determines at least one of shutter speed and aperture according to the photographing mode. The control unit 102 also transmits a gain adjustment amount according to a set sensitivity level to an A/D converter unit 104. The set sensitivity level may be a fixed sensitivity level set by the user or a sensitivity level dynamically set by the control unit 102 based on a result of the AE process. The control unit 102 also determines whether or not a flash unit 111 needs to emit light when photographing according to the flash settings, the automatically determined shutter speed or the like. If it is determined that the flash unit 111 needs to emit light, the control unit 102 instructs an EF processing unit 110 to turn on the flash. Upon receiving an instruction to turn on the flash from the control unit 102, the EF processing unit 110 controls the flash unit 111 so as to emit light at the time at which a shutter of an exposure mechanism 109a opens.

Furthermore, the control unit 102 implements an auto focus control function by driving a focusing lens of a lens 108a using a lens drive unit 108 so as to detect a change in the contrast of digital image data output by the image processing unit 105.

An image sensor 103 is a photoelectric conversion device, such as a CCD image sensor or a CMOS image sensor, and converts an object's optical image imaged via the lens 108a and the exposure mechanism 109a into an analog electric signal (analog image data) on a pixel by pixel basis.

The lens 108a has an AF function, and drives the focusing lens according to the control of the lens drive unit 108 (described later). The exposure mechanism 109a has a diaphragm and a mechanical shutter, and exposes the image sensor 103 with the object's optical image by opening an optical path between the lens 108a and the image sensor 103 using the aperture and shutter speed according to the control of the mechanism drive unit 109 (described later).

The A/D converter unit 104 performs correlated double sampling, gain adjustment, A/D conversion and the like on the analog image data output from the image sensor 103, and outputs the data as digital image data. The gain adjustment amount (amplification ratio) to be applied is provided from the control unit 102. As the gain increases, the noise component included in the image also increases.

The image processing unit 105 performs image processing, such as white balance correction, a pixel interpolation process, a gamma correction process and color-difference signal generation, on the digital image data output from the A/D converter unit 104, and outputs, for example, YUV image data as processed digital image data.

A face detection unit 106 continuously detects an object using image recognition. The face detection unit 106 detects, for example, a human face as the object from the images of the digital image data output by the A/D converter unit 104. Then, the face detection unit 106 transmits face region information (face information) that includes, for example, the position, range (size), reliability (the degree of certainty of recognizing it as a face) and the like of the detected face to the control unit 102 and a moving-subject detection unit 115. As the face position, the center coordinates of the face region can be used.

As the face detection used in the present embodiment, known face detection techniques can be used. Examples of known face detection techniques include a learning-based method that uses a neural network or the like, a method in which a part that has a distinctive shape, such as an eye, the nose or the mouth, is obtained from images using template matching, and a face is detected if the degree of similarity is high, etc. Other examples include a method in which an image feature amount, such as skin color or the shape of an eye, is detected and statistical analysis is performed, and many more have been proposed. Usually, a plurality of these methods are combined to improve the accuracy of face detection. A specific example can be a method disclosed by Japanese Patent Laid-Open No. 2002-251380 that performs face detection using wavelet transformation and an image feature amount to detect a face.

The moving-subject detection unit 115 detects a moving subject to detect an object. The moving-subject detection unit 115 detects a movement of the object (face region) from the images of two successive frames in time series of digital image data output from the image processing unit 105, determines a moving subject, and calculates object movement information (position, range, movement amount). The moving-subject detection unit 115 implements a moving subject (object) tracking function by sequentially performing moving-subject detection on three successive frames or more of digital image data.

Also, the face detection unit 106 can set parameter values for use in the next face detection process based on the movement information obtained from the moving-subject detection unit 115.

For example, a threshold value of reliability of recognizing it as a face (the degree of certainty of determining it as a face) is lowered when the face region is positioned in the center portion of the screen and the movement amount is large, relative to that when the face region is positioned at the edge of the screen and the movement amount is small, so as to make it possible to track even a moving face, improving the detection rate.

An EVF display unit 107 includes a display apparatus such as an LCD, and displays images based on the digital image data that has been processed by the image processing unit 105.

A format converting unit 112 generates a data file to be recorded that is compliant with, for example, DCF (design rule for camera file system) from the digital image data output from the image processing unit 105. The format converting unit 112 performs JPEG encoding, generation of a file header and the like during the process of generating a data file.

An image recording unit 113 records the data file generated by the format converting unit 112 into an internal memory of the digital camera 100, a removable medium inserted into the digital camera 100, or the like.

An external I/F 114 is an interface for connecting the digital camera 100 to an external apparatus such as a PC (personal computer), a printer or the like. The external I/F 114 performs communication with the external apparatus in compliance with a common standard such as, for example, USB, IEEE 1394 or IEEE 802.11.

As described above, in the digital camera 100 of the present embodiment, by combining the face detection function performed by the face detection unit 106 and the moving-subject tracking function performed by the moving-subject detection unit 115, even when face detection is no longer possible with the face detection function, the face region can be continuously tracked.

For example, a commonly-used face detection function can detect a frontal face with high accuracy, but detection of a face turned to the side or a rearward-looking face is difficult. In such a situation, by tracking a face region that had been detected by applying moving-subject detection to that face region, the face region can be continuously identified.

FIGS. 2A to 2D are diagrams schematically illustrating the object detection through combined use of the face detection function and the moving-subject tracking function.

Figure 2A:
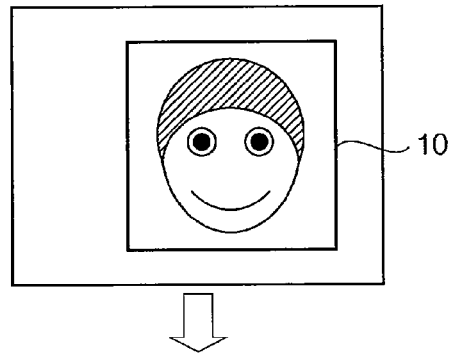
FIGS. 2A to 2D are diagrams schematically illustrating object detection performed through combined use of a face detection function and a moving-subject tracking function.

In FIG. 2A, a person is facing forward. In this state, the face detection function can detect the person's face with high accuracy. A face frame 10 is a display for informing the user of a currently detected face, and is displayed superimposed on the EVF image.

Figure 2B:
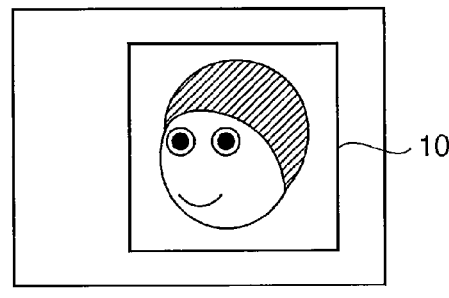
Figure 2C:
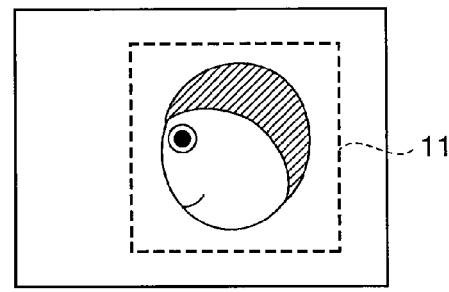
Figure 2D:
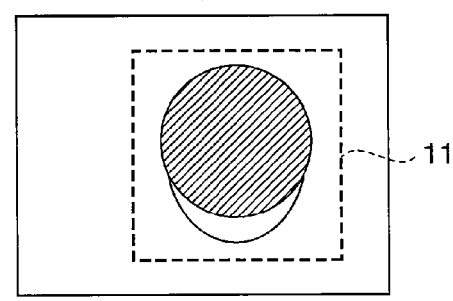

In FIG. 2B, the person slightly turns to his/her right, but the face detection function can still detect the face. When the person further turns to his/her right, and the face is in full profile (FIG. 2C), the face detection function can no longer detect the face. In such a case, by performing the moving-subject tracking function of the moving-subject detection unit 115 on the face region that had been detected, it becomes possible to track the face. In FIG. 2C, a face frame 11 is indicated by a dotted line to show that the moving-subject tracking function is being performed. Even when the person further turns and faces backward (FIG. 2D), the face frame 11 is displayed continuously as long as the face region is tracked by the moving-subject tracking function.

As described above, the combination of the face detection function and the moving-subject tracking function is effective, but the following problems can occur.

Because the face detection function detects an image region that has a general feature of a face as a face, the face detection function may, in some cases, recognize a non-face region as a face if the non-face region has a feature similar to a feature of a face. In the specification, recognizing a non-face image region as a face is referred to as an "incorrect detection".

Also, the moving-subject tracking function merely detects a movement in the image region based on the correlation between images, and does not get involved in the details of the images. Accordingly, if an incorrect detection occurs with the face detection function, and a moving subject is tracked based on that result, a non-face region will be continuously recognized as a face region. In addition, when displaying a face frame on the face region as shown in FIGS. 2A to 2D, the face frame is continuously displayed in an incorrect region.

FIGS. 3A to 3D are diagrams schematically illustrating this problem. As in FIGS. 2A to 2D, the face frame 10 that shows that the face detection function is being performed is indicated by a solid line, and the face frame 11 that shows that the moving-subject tracking function is being performed is indicated by a dotted line.

Figure 3A:
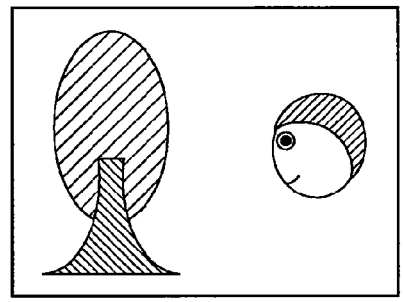
FIGS. 3A to 3D are diagrams used to illustrate a problem that occurs when an incorrectly detected face region is tracked.
Figure 3B:
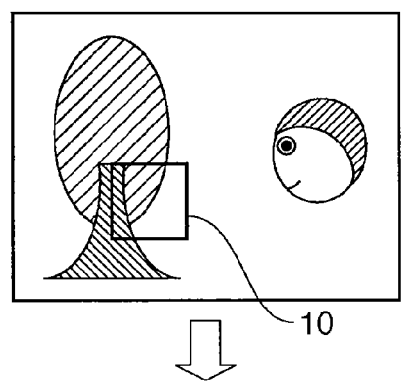
Figure 3C:
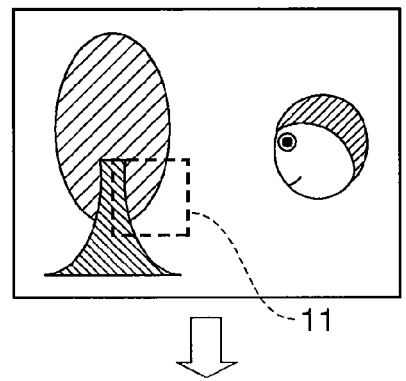
Figure 3D:
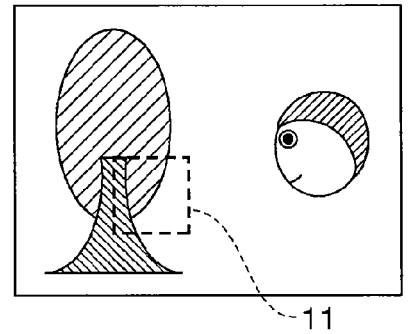

In a situation as shown in FIG. 3A, for example, there is a case in which the face detection function may incorrectly detect an object other than a face due to ambient light conditions or the like (FIG. 3B). Such an incorrect detection is often resolved in a short time, and the time period during which the face frame 10 is displayed is short. However, in the case of the combined use of the face detection function and the moving-subject tracking function, after such an incorrect detection is resolved, object detection is performed by moving-subject tracking as in the case where a correct detection is no longer possible, and the face frame 11 is continuously displayed on the non-face portion (FIG. 3C, FIG. 3D).

In view of this, in the present embodiment, whether or not to use the moving-subject tracking function is evaluated based on the status of face detection so as to suppress an incorrectly detected face region from being tracked.

Operation

An operation of the digital camera 100 of the present embodiment will be described next.

First, when the user of the digital camera 100 turns on the power switch of the operation unit 101, the control unit 102 detects that fact, and supplies power from a battery or AC input (not shown) to the various units of the digital camera 100.

The digital camera 100 of the present embodiment is configured to start an EVF display operation upon power supply. Specifically, the mechanical shutter of the exposure mechanism 109a opens to expose the image sensor 103. The charge stored in each pixel of the image sensor 103 is sequentially read out at a cycle that achieves a predetermined frame rate, and output to the A/D converter unit 104 as analog image data. In this manner, in the present embodiment, the images displayed on the EVF are acquired by successive photographing using what is called an electronic shutter.

The A/D converter unit 104 performs correlated double sampling, gain adjustment, A/D conversion and the like on the analog image data output from the image sensor 103, and outputs the data as digital image data.

The image processing unit 105 performs image processing, such as white balance correction, a pixel interpolation process, a gamma correction process and color-difference signal generation, on the digital image data output from the A/D converter unit 104, and outputs, for example, YUV image data as processed digital image data.

The face detection unit 106 detects a human face from the images of the digital image data output by the A/D converter unit 104 using image recognition, and transmits face region information (face information) that includes, for example, the position, range, reliability (the degree of certainty of recognizing it as a face) of the detected face to the control unit 102.

The moving-subject detection unit 115 detects a moving subject from a plurality of successive images in time series of the digital image data output by the image processing unit 105, and calculates the position, range and movement amount of the moving subject. When performing moving-subject detection on three successive images or more, the moving-subject detection unit 115 performs detection on the first two images, then detection on the next two images using the result of the previous detection, and continues successively by performing detection in this manner. The moving-subject detection unit 115 also detects a movement of the digital camera 100 by an angular velocity sensor.

The control unit 102 determines a gain adjustment amount to be transmitted to the A/D converter unit 104. The control unit 102 also switches between determining an object region using only the result of object detection performed by the face detection unit 106 and determining an object region using both the result of object detection performed by the face detection unit 106 and the result of object detection performed by the moving-subject detection unit 115, according to the gain adjustment amount. The switching control will be described later in detail.

The image processing unit 105 performs various image processes on the digital image data output from the A/D converter unit 104, and outputs processed digital image data.

Also, the EVF display unit 107 displays images one after another according to the image data output by the image processing unit 105.

The control unit 102 controls each unit so as to repeatedly execute the above EVF display process unless it receives a signal SW1 transmitted from the operation unit 101 (that is, a signal indicative of the shutter switch being pressed halfway).

If, on the other hand, the control unit 102 receives the transmission of a signal SW1, the control unit 102 performs AF and AE processes using the latest captured image at the time at which it received the signal, and determines the focus position and the exposure conditions. Furthermore, the control unit 102 determines whether or not the flash unit 111 needs to emit light. Whether or not the flash unit 111 needs to emit light may be determined by making settings in advance with the operation unit 101 and reading out the settings data, or may be determined automatically by detecting the darkness of the surroundings.

The control unit 102 is on standby as long as the signal SW1 is continuously transmitted from the operation unit 101, or until it receives the transmission of a signal SW2 (that is, a signal indicative of the shutter switch being pressed fully). If the transmission of the signal SW1 stops before the control unit 102 receives the transmission of the signal SW2, the control unit 102 resumes the EVF display process.

Upon receiving the transmission of the signal SW2, the control unit 102, when causing the flash unit 111 to emit light, controls the EF processing unit 110 to cause the flash unit 111 to perform pre-emission of light, and performs processes such as calculating the amount of light emitted and weighting EF frames. Then, the control unit 102 instructs the EF processing unit 110 to cause the flash unit 111 to emit light in an amount calculated from the pre-emission of light. When not causing the flash unit 111 to emit light, the control unit 102 advances to a photographing process without performing the above light adjustment control.

The photographing process is different from the imaging process performed to display images on the EVF, primarily in that the image sensor 103 is exposed by controlling the exposure mechanism 109a using the aperture and shutter speed determined by the AE process, and generally, the number of pixels that are read out from the image sensor 103 is larger.

Also, because photographing is a process for capturing an image to be recorded, the processed digital image data output by the image processing unit 105 is converted to a data file to be recorded by the format converting unit 112, and then recorded into a recording medium by the image recording unit 113.

Face Detection Process

An object detection process (face detection process) performed by the face detection unit 106 will be described next.

In the present embodiment, the face detection unit 106 has a plurality of detection modes, and performs a face detection process in one of the modes. There is no particular limitation on the detection mode, and examples of the detection mode may include: a high-speed detection mode in which the face detection process can be performed quickly although the conditions for the face detection are limited; and a low-speed detection mode in which a longer time is required for the face detection process although the conditions for the face detection are wide-ranging. In order to shorten the time required for the face detection process in these modes, a limitation mode that limits a region for performing face detection in the screen according to the results of face detection performed in the past, and a non-limitation mode that has no limitation may also be included.

In the following description, it is assumed that the face detection unit 106 performs a face detection process by dynamically selecting one from among these detection modes.

Figure 4A:
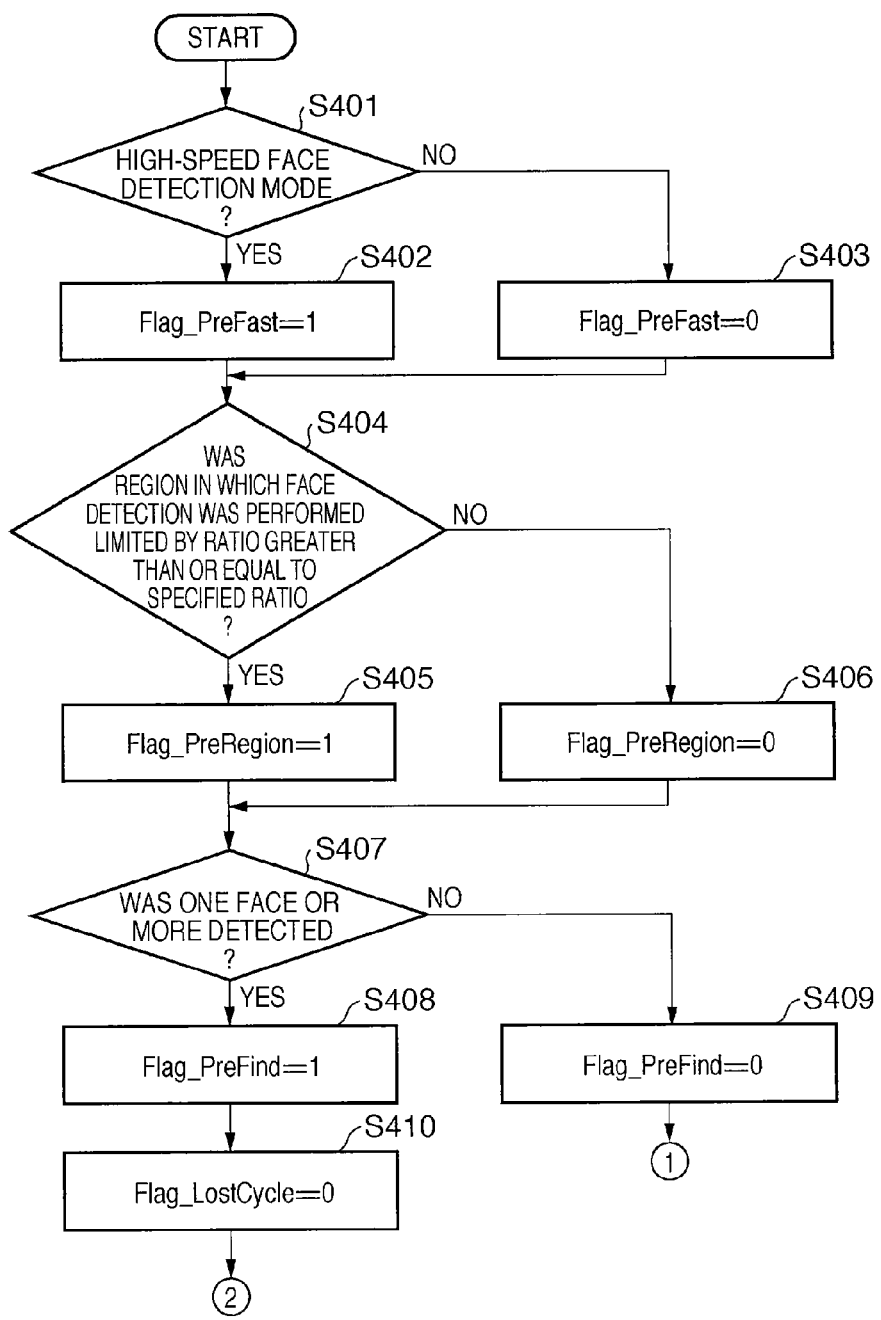

After having executed a face detection process, the face detection unit 106 sets various flags that represent information regarding the executed face detection process, and then, determines a detection mode in which the next face detection process is performed according to the values of the flags. The flowcharts shown in FIGS. 4A and 4B show a process for setting flags and determining a detection mode that is performed after a face detection process ends.

In S401, the face detection unit 106 evaluates whether or not the previous face detection process was performed in the high-speed detection mode. If the previous face detection process was performed in the high-speed detection mode, the face detection unit 106 sets a flag (Flag_PreFast) to 1 (S402), and if the previous face detection process was performed in the low-speed detection mode, the face detection unit 106 sets the flag to 0 (S403). The various flags are assumed to be implemented, for example, as storage regions assigned to specific addresses of an internal memory (not shown) of the face detection unit 106.

In S404, the face detection unit 106 evaluates whether the region in which face detection was performed in the previous face detection process was limited by a ratio greater than or equal to a specified ratio relative to one frame worth of image. If the region in which face detection was performed in the previous face detection process was limited by a ratio greater than or equal to a specified ratio relative to one frame worth of image, the face detection unit 106 sets a flag (Flag_PreRegion) to 1 (S405), and if no limitation was imposed on the region or the region was limited by a ratio less than the specified ratio, the face detection unit 106 sets the flag to 0 (S406).

In S407, the face detection unit 106 evaluates whether or not one face or more was detected in the previous face detection process. If one face or more was detected in the previous face detection process, the face detection unit 106 sets a flag (Flag_PreFind) to 1 (S408), and if no face was detected, the face detection unit 106 sets the flag to 0 (S409).

In the case where one face or more was detected in the previous face detection process, the face detection unit 106 further sets the value of a flag (Flag_LostCycle), which will be described later, to 0 (S410). On the other hand, in the case where no face was detected in the previous face detection process, the face detection unit 106 evaluates whether or not the time during which no face was detected reached a specified time (S411). If the time during which no face was detected reached a specified time, the face detection unit 106 sets a flag (Flag_LostCycle) to 1 (S412), and if the time during which no face was detected did not reach a specified time, the face detection unit 106 sets the flag to 0 (S413).

In S414, the face detection unit 106 evaluates whether or not all of the faces detected in the previous face detection process have a size greater than or equal to a threshold value (the smallest of the detected faces has a size greater than or equal to the threshold value). If all of the faces detected in the previous face detection process have a size greater than or equal to a threshold value, the face detection unit 106 sets a flag (Flag_PreFaceSize) to 1 (S415), and if a face whose size is less than the threshold value is detected, the face detection unit 106 sets the flag to 0 (S416).

In S417, the face detection unit 106 evaluates whether or not there was a face that extended beyond the face region among the faces detected in the previous face detection process. If all of the faces remained within the face region, the face detection unit 106 sets a flag (Flag_PreInside) to 1 (S418), and if there was a face that extended beyond the face region, the face detection unit 106 sets the flag to 0 (S419).

In S420, the face detection unit 106 determines a detection mode for the next face detection process by referring to the values of the six flags set in the processes spanning from S401 to S419.

FIG. 5 is a flowchart illustrating a process for determining a detection mode performed in S420 of FIG. 4B in detail.

In S4201, the face detection unit 106 evaluates whether or not the value of Flag_PreFind is 1. If the value of Flag_PreFind is 1, a face has been detected in the previous face detection process. Accordingly, the high-speed detection mode in which the conditions for face detection are narrow can be executed based on the information such as the coordinates, angle and the like of the face detected in the previous face detection process, so the face detection unit 106 sets a high-speed detection mode (S4209).

If, on the other hand, the value of Flag_PreFind is 0, the face detection unit 106 evaluates whether or not the value of Flag_LostCycle is 1. If the value of Flag_LostCycle is 0, the face detection unit 106 further evaluates whether or not the value of Flag_PreFast is 1.

If the value of Flag_LostCycle is 0, there is a possibility that an object's face is not detected temporarily due to the person as the object having turned to the side or the like. Accordingly, if the value of Flag_PreFast is 1 (which indicates that high-speed detection mode was performed in the previous face detection process), the face detection unit 106 sets (maintains) a high-speed detection mode (S4209). By doing so, even when the lighting or the angle of the face changes momentarily, the high-speed detection mode is continued for a specified time, so that the face can be recognized immediately when the face is detected again.

If, on the other hand, the value of Flag_LostCycle is 1, or if the value of Flag_LostCycle is 0, but the value of Flag_PreFast is 0 (which indicates that low-speed detection mode was performed in the previous face detection process), the face detection unit 106 sets a low-speed detection mode (S4207). By doing so, the conditions for face detection can be expanded, thereby increasing the possibility of face detection, although a longer time is required for the face detection process.

Next, the face detection unit 106 determines whether or not the value of Flag_PreRegion is 1 (S4211). If the value of Flag_PreRegion is 0, the face detection unit 106 further evaluates whether or not the value of Flag_PreInside is 1 (S4213).

If the value of Flag_PreRegion is 0, and the value of Flag_PreInside is 1, it means that all of the detected faces remained within the face detection region. Accordingly, the face detection unit 106 sets a limitation mode (S4215). At this time, the ratio used to limit the region and the magnification of the electronic zoom during the face detection process may be further increased.

If, on the other hand, both the value of Flag_PreRegion and the value of Flag_PreInside are 0, it means that there is a face region that extended beyond the limited face detection region, and thus, the face detection unit 106 sets (maintains) a non-limitation mode (S4219). By doing so, face detection can be performed in the entire frame image. If the value of Flag_PreInside is 0 in S4213, the limitation ratio may be decreased gradually.

If the value of Flag_PreRegion is 1 in S4211, the face detection unit 106 further evaluates whether or not the value of Flag_PreFaceSize is 1 (S4217). If the value of Flag_PreFaceSize is 1, it indicates that all faces have been detected with a sufficient size, so there is no need to limit the face detection region (to use the electronic zoom). Accordingly, the face detection unit 106 sets (maintains) a non-limitation mode (S4219).

If, on the other hand, the value of Flag_PreFaceSize is 0, it means that there is a face with an insufficient size. In this case, the face detection unit 106 limits the face detection region (uses the electronic zoom), and sets a limitation mode to make it easier to detect the small face (S4215). For example, when a face detection algorithm is used in which the processing time becomes shorter as the size of the smallest face that can be detected increases, it becomes possible to detect a small face while suppressing the processing time by limiting the region to be detected and executing the electronic zoom.

Moving-Subject Tracking Process

Figure 6:
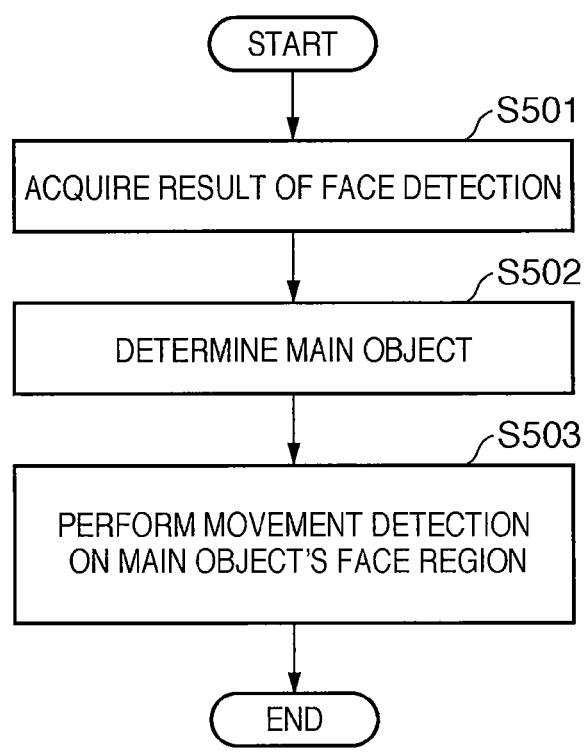
FIG. 6 is a flowchart illustrating an object tracking operation performed by a moving-subject detection unit of a digital camera according to an embodiment of the present invention.

An object detection (tracking) process performed by the moving-subject detection unit 115 will be described with reference to the flowchart shown in FIG. 6.

In S501, the moving-subject detection unit 115 acquires face information (face reliability, the coordinates of the face, the size of the face, etc.) from the face detection unit 106. Here, face information on all of the detected faces is acquired. The moving-subject detection unit 115 stores a predetermined number of frames worth of face information acquired from the face detection unit 106 in an internal memory (not shown) as a face detection history.

If the moving-subject detection unit 115 acquires information on a plurality of faces in S501, the moving-subject detection unit 115 determines a face that serves as the main object based on the face information in S502. There is no particular limitation on the method of determining the main object, and it can be determined, for example, based on the face reliability, the position of the face in the entire image, and the face size. By way of example, a method in which a weight is calculated for each detected face to obtain a plurality of weights, and the main object is determined based on the weights will be described below. If, on the other hand, only one face is detected, the moving-subject detection unit 115 selects the face as the main object.

First, the moving-subject detection unit 115 determines a first weight based on the reliability of each detected face. For example, the moving-subject detection unit 115 sets the weight of a face whose reliability is high, or in other words, that is highly likely to be detected as a face, to 1 or a value close to 1, and sets the weight of a face whose reliability is low to 0 or a value close to 0. As for a face whose reliability is moderate, the moving-subject detection unit 115 sets the weight to be an appropriate value between the high weight and the low weight according to the reliability.

Subsequently, the moving-subject detection unit 115 determines a second weight based on the face size. It is assumed here that, for example, a square face region has been detected by the face detection unit 106, and that the threshold values of the length of one side of the face region are Th_Length_1 and Th_Length_2 (Th_Length_1>Th_Length_2). In this case, the moving-subject detection unit 115 sets the weight of a face whose one side has a length of Th_Length_1 or greater to 1 or a value close to 1. Also, the moving-subject detection unit 115 sets the weight of a face whose one side has a length of Th_Length_2 or less to 0 or a value close to 0. Furthermore, the moving-subject detection unit 115 sets the weight of a face whose one side has a length between Th_Length_1 and Th_Length_2 to a value between 0 and 1 according to the length of one side. In this case, a greater value is set for the weight as the length of one side increases.

The moving-subject detection unit 115 further determines a third weight based on the position of the face in the entire image. For example, the moving-subject detection unit 115 finds the distance from the center of the image to the center of the face region. A greater value is set for the weight of the face as the distance decreases. For example, assuming that the coordinates of the two centers are expressed in an xy coordinate system, the distance may be determined as the total of a difference in the X direction components and a difference in the y direction components, or may be determined using the Pythagorean theorem.

It is assumed, for example, that the distance threshold values are Th_CenterDist_1 and Th_CenterDist_2 (Th_CenterDist_1>Th_CenterDist_2). The moving-subject detection unit 115 sets the weight of a face that has a distance of Th_CenterDist_1 or greater to 0 or a value close to 0, and sets the weight of a face that has a distance of Th_CenterDist_2 or less, or in other words, a face that is positioned near the center of the image, to 1 or a value close to 1. As for a face having a distance between Th_CenterDist_1 and Th_CenterDist_2, the moving-subject detection unit 115 sets the weight to be a value between 0 and 1 according to the distance. In this case, a greater value is set for the weight as the distance decreases.

Then, the moving-subject detection unit 115 determines the main object based on the first to third weights. There is no particular limitation on the usage of the weights, and for example, a face that has the largest sum or product of three weights can be determined as the main object.

In S503, the moving-subject detection unit 115 performs movement detection on the face that has been determined as the main object in S502. A movement of the object (face) can be detected by, for example, performing a differential comparison of luminance values around the face region of the main object between successive image frames.

Specifically, in two successive frame images in time series, a main object's face is determined first in the first frame image. At this time, for example, the face reliability, the position of the face and the size of the face may be stored. Then, in the succeeding frame image, moving-subject tracking is performed on the coordinates at which the main object was positioned. The moving-subject tracking is a process for detecting a movement of the main object (face region) detected in the preceding frame image and determining a region to which the main object has moved in the succeeding frame image. For example, a search is performed for a region whose variation amount of luminance values is the smallest in the succeeding frame image by pattern matching based on the pattern of the luminance values of the preceding frame that is targeted for motion detection, and the found region is determined as the region to which the main object has moved.

Main Object Tracking Process

A method for evaluating whether or not to perform object tracking based on moving-subject detection in the digital camera of the present embodiment will be described next with reference to the flowchart shown in FIG. 7. This evaluation process is performed continuously by the moving-subject detection unit 115 upon receiving, for example, the transmission of the result of face detection from the face detection unit 106.

In S601, the moving-subject detection unit 115 evaluates whether the face has been detected successively a specified number of times or more (it is assumed here that the frequency is set to a constant value Count_1). If the face has been detected successively a number of times greater than or equal to Count_1, the moving-subject detection unit 115 advances the procedure to S603. Otherwise, the moving-subject detection unit 115 advances the procedure to S602.

If the face has not been detected successively a number of times greater than or equal to Count_1, in S602, the moving-subject detection unit 115 evaluates whether the face has been detected a predetermined number of times in a predetermined number (defined as n) of immediately preceding frame images. The frequency at this time is assumed to be set to a constant value Count_2 (<n), and the value of n may be the same as the value of Count_1. In this evaluation, whether or not the face has been detected successively does not matter. If the face has been detected a number of times greater than or equal to Count_2, the moving-subject detection unit 115 advances the procedure to S603. Otherwise, the moving-subject detection unit 115 advances the procedure to S606.

If the face has been detected successively a number of times greater than or equal to Count_1, or if the face has been detected a number of times greater than or equal to Count_2 in n frames, in S603, the moving-subject detection unit 115 pays attention to the result of face detection. The moving-subject detection unit 115 calculates the movement amount of the center coordinates during a specified time (in a specified number of immediately preceding frames) by referring to the face information stored in the internal memory for the face region of the main object selected in the manner described above. The movement amount may be, for example, the total of movement amounts of the frames included in the specified time, or the movement amount between the first frame image and the last frame image that correspond to the start and end of the specified time. Then, the moving-subject detection unit 115 evaluates whether or not the calculated movement amount is a predetermined threshold value Th_Dist or greater. If the movement amount is less than Th_Dist, the procedure advances to S604. If the movement amount is Th_Dist or greater, the procedure advances to S606.

If it is determined in S603 that the movement amount of the center coordinates of the face region of the main object during the specified time is within Th_Dist, in S604, the moving-subject detection unit 115 pays attention to the variation amount in the size of the face region. As in S603, the moving-subject detection unit 115 calculates the variation amount of the size of the face region of the main object during a specified time (in a specified number of immediately preceding frames), and evaluates whether or not the calculated variation amount is a predetermined threshold value Th_Size or greater.

The variation amount may be, for example, the total of variation amounts of the frames included in the specified time, or the variation amount between the first frame image and the last frame image that correspond to the start and end of the specified time. If the face region is square, for example, the variation amount can be determined as a difference or ratio of one side of the face region. Then, if the calculated variation amount is less than Th_Size, the moving-subject detection unit 115 advances the procedure to S605. If the variation amount is Th_Size or greater, the moving-subject detection unit 115 advances the procedure to S606.

The threshold values Th_Dist and Th_Size may be determined independently, or may be mutually correlated values. For example, in the case where the face is located in a position far from the digital camera 100 and in the case where the face is located in a position close to the digital camera 100, if the face has moved similarly, both the movement amount of the center coordinates of the face region and the variation amount of the size of the face region become smaller in the case where the face is located in a position far from the digital camera 100. To address this, when the threshold value Th_Dist is reduced, the threshold value Th_Size is reduced as well, and when the threshold value Th_Dist is increased, the threshold value Th_Size is increased as well. By doing so, the reliability of the result of face detection can be determined according to the distance between the object and the digital camera 100.

In S605, the moving-subject detection unit 115 determines that object tracking based on moving-subject detection should be executed. That is, if the face has been detected successively a number of times greater than or equal to Count_1, or the face has been detected a number of times greater than or equal to Count_2 in n frames, and the movement and size of the face region as the main object changes little during a specified time (in a specified number of immediately preceding frames), the moving-subject detection unit 115 judges that the reliability of the result of face detection is high, and determines that object tracking should be executed.

On the other hand, in S606, the moving-subject detection unit 115 determines that object tracking based on moving-subject detection should not be executed. That is, if the frequency at which the face has been detected is low, and the movement and size of the face region as the main object changes greatly during a specified time (in a specified number of immediately preceding frames), the moving-subject detection unit 115 determines that the reliability of the result of face detection is low, so object tracking is not executed.

By determining whether or not to perform object tracking in the manner described above, for example, when a plurality of faces are detected and the main object has changed among them, the possibility of tracking an incorrect object can be suppressed.

As described thus far, according to the present embodiment, the reliability of object detection is evaluated based on the history of the results of object detection using image recognition. If it is determined that the reliability of object detection using image recognition is high, the detected object region is tracked using moving-subject detection. If, on the other hand, it is determined that the reliability of object detection using image recognition is low, the detected object region is not tracked.

Consequently, the possibility of tracking of an incorrectly detected face region can be suppressed. As a result, it becomes possible to avoid the problems in that control is performed to focus on the background rather than the object when photographing and that incorrect exposure settings are made, improving the accuracy of AE control and AF control. In addition, when presenting a display of an object region (displaying a frame or the like in the screen), it is possible to prevent the frame from being displayed continuously on an incorrectly detected face region, so stable display becomes possible.

Other Embodiments

In the embodiment described above, even when it is determined to not perform object tracking, the moving-subject detection by the moving-subject detection unit 115 may be performed although the detection result will not be used, or the moving-subject detection operation performed by the moving-subject detection unit 115 may be stopped. In the case of the latter, the control unit 102 stops the moving-subject detection operation.

When it is determined to perform object tracking, the object detection of the face detection unit 106 performed on a specified number of subsequent frames may be stopped, or the frequency at which the object detection of the face detection unit 106 is performed may be reduced. Furthermore, the moving-subject detection unit 115 may perform movement detection not only on the main object but also on all of the faces detected by the face detection unit 106. The evaluation of whether or not to perform object tracking based on moving-subject detection shown in FIG. 7 may be performed on all of the detected faces, and the main object may be selected from among the objects that have satisfied the conditions for object tracking based on the face reliability, the position of the face in the entire screen and the face size.

It should be understood that the present invention is not limited to the specific configuration described in the above embodiment, and all modifications or changes made to the constituent elements and operations that are not essential are intended to be embraced within the scope of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-217323, filed on Aug. 26, 2008, which is hereby incorporated by reference herein its entirety.

What is claimed is:

1. An image processing apparatus comprising:
    an acquisition unit configured to acquire images that are successively captured with an image sensor;
    a first detection unit configured to detect a predetermined object in the images acquired by the acquisition unit;
    a second detection unit configured to detect a region including at least a part of the object detected by the first detection unit in the images acquired by the acquisition unit; and
    a control unit configured to determine, based on detection results of the first detection unit for a predetermined plural number of images, whether or not to track the predetermined object using the region detected by the second detection unit.

2. The image processing apparatus according to claim 1, wherein the control unit determines to track the predetermined object using the region detected by the second detection unit if the number of images, in which the predetermined object is detected by the first detection unit, among the predetermined plural number of images is not less than a threshold value.

3. The image processing apparatus according to claim 1, wherein the control unit determines to track the predetermined object using the region detected by the second detection unit if the predetermined object is detected by the first detection unit in each of the predetermined plural number of images.

4. The image processing apparatus according to claim 1, wherein the control unit determines to track the predetermined object using the region detected by the second detection unit if the number of images, in which the predetermined object is detected by the first detection unit, among the predetermined plural number of images is not less than a first threshold value and a movement amount of the region including the predetermined object is less than a second threshold value.

5. The image processing apparatus according to claim 1, wherein the control unit determines to track the predetermined object using the region detected by the second detection unit if the number of images, in which the predetermined object is detected by the first detection unit, among the predetermined plural number of images is less than a first threshold value and a variation amount in size of the region including the predetermined object is less than a third threshold value.

6. The image processing apparatus according to claim 1, wherein the second detection unit detects a region having a high correlation with the predetermined object detected by the first detection unit as the region including the predetermined object.

7. The image processing apparatus according to claim 6, wherein the first detection unit detects the predetermined object in the images acquired by the acquisition unit with image recognition.

8. A method for controlling an image processing apparatus comprising:
    an acquisition step of acquiring images that are successively captured with an image sensor;
    a first detection step of detecting a predetermined object in the images acquired in the acquisition step;
    a second detection step of detecting a region including at least a part of the object detected by the first detection unit in the images acquired in the acquisition step; and
    a control step of determining, based on detection results of the first detection step for a predetermined plural number of images, whether or not to track the predetermined object using the region detected by the second detection step.

9. A non-transitory computer-readable recording medium having recorded thereon a program for causing a computer of an image capturing apparatus to execute each step of the method for controlling an image capturing apparatus according to claim 8.

10. An image capturing apparatus comprising:
    an image sensor configured to capture images successively;
    a first detection unit configured to detect a predetermined object in the images captured by the image sensor;
    a second detection unit configured to detect a region including at least a part of the object detected by the first detection unit in the images captured by the image sensor; and
    a control unit configured to determine, based on detection results of the first detection unit for a predetermined plural number of images, whether or not to track the predetermined object using the region detected by the second detection unit.

11. The image processing apparatus according to claim 1, wherein the first detection unit detects a face as the predetermined object.

\* \* \* \* \*